United States Patent
Wang et al.

(10) Patent No.: US 11,868,191 B1
(45) Date of Patent: Jan. 9, 2024

(54) BATTERY MITIGATED DATACENTER POWER USAGE

(71) Applicant: Amazon Technologies, Inc., Seattle, WA (US)

(72) Inventors: Ligong Wang, Austin, TX (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 968 days.

(21) Appl. No.: 16/780,490

(22) Filed: Feb. 3, 2020

(51) Int. Cl.
  *G06F 1/30* (2006.01)
  *H02J 9/06* (2006.01)
  *G06Q 50/06* (2012.01)
  *H02J 7/00* (2006.01)
  *G06Q 30/0201* (2023.01)

(52) U.S. Cl.
  CPC ......... *G06F 1/305* (2013.01); *G06Q 30/0206* (2013.01); *G06Q 50/06* (2013.01); *H02J 7/007* (2013.01); *H02J 7/0063* (2013.01); *H02J 9/06* (2013.01)

(58) Field of Classification Search
  CPC .... G06F 1/305; G06Q 30/0206; G06Q 50/06; H02J 7/0063; H02J 7/007; H02J 9/06
  See application file for complete search history.

(56) References Cited

U.S. PATENT DOCUMENTS

| | | | |
|---|---|---|---|
| 2003/0020333 A1* | 1/2003 | Ying | H02J 13/0004 307/38 |
| 2009/0313034 A1* | 12/2009 | Ferro | B60L 53/68 705/1.1 |
| 2015/0278968 A1* | 10/2015 | Steven | G06Q 50/06 705/7.35 |
| 2016/0043547 A1* | 2/2016 | Patel | H02J 9/062 307/19 |
| 2016/0202682 A1* | 7/2016 | Matsumoto | H02J 3/003 700/291 |
| 2018/0013318 A1* | 1/2018 | Nguyen | H02J 7/0024 |
| 2018/0090943 A1* | 3/2018 | Wu | H02J 7/0068 |
| 2018/0097364 A1* | 4/2018 | Kato | H02J 7/35 |
| 2018/0239318 A1* | 8/2018 | Hwang | G06Q 50/06 |
| 2020/0366126 A1* | 11/2020 | Lai | H02M 1/08 |

* cited by examiner

*Primary Examiner* — Zhipeng Wang
(74) *Attorney, Agent, or Firm* — Kilpatrick Townsend & Stockton LLP

(57) ABSTRACT

Methods for providing power to electronic components (e.g., servers in a datacenter, or other devices) can include providing AC power received from an external source to the devices. During periods of high demand, when costs of external AC power exceed a threshold, or when availability of external AC power is decreased, distributed backup power supply systems can be utilized to temporarily offset or to reverse consumption of external AC power. Such distributed backup power systems can be periodically recharged during periods of low power demand, and thus consistently retain adequate charge for backup use in the event of power loss.

16 Claims, 9 Drawing Sheets

FIG. 1

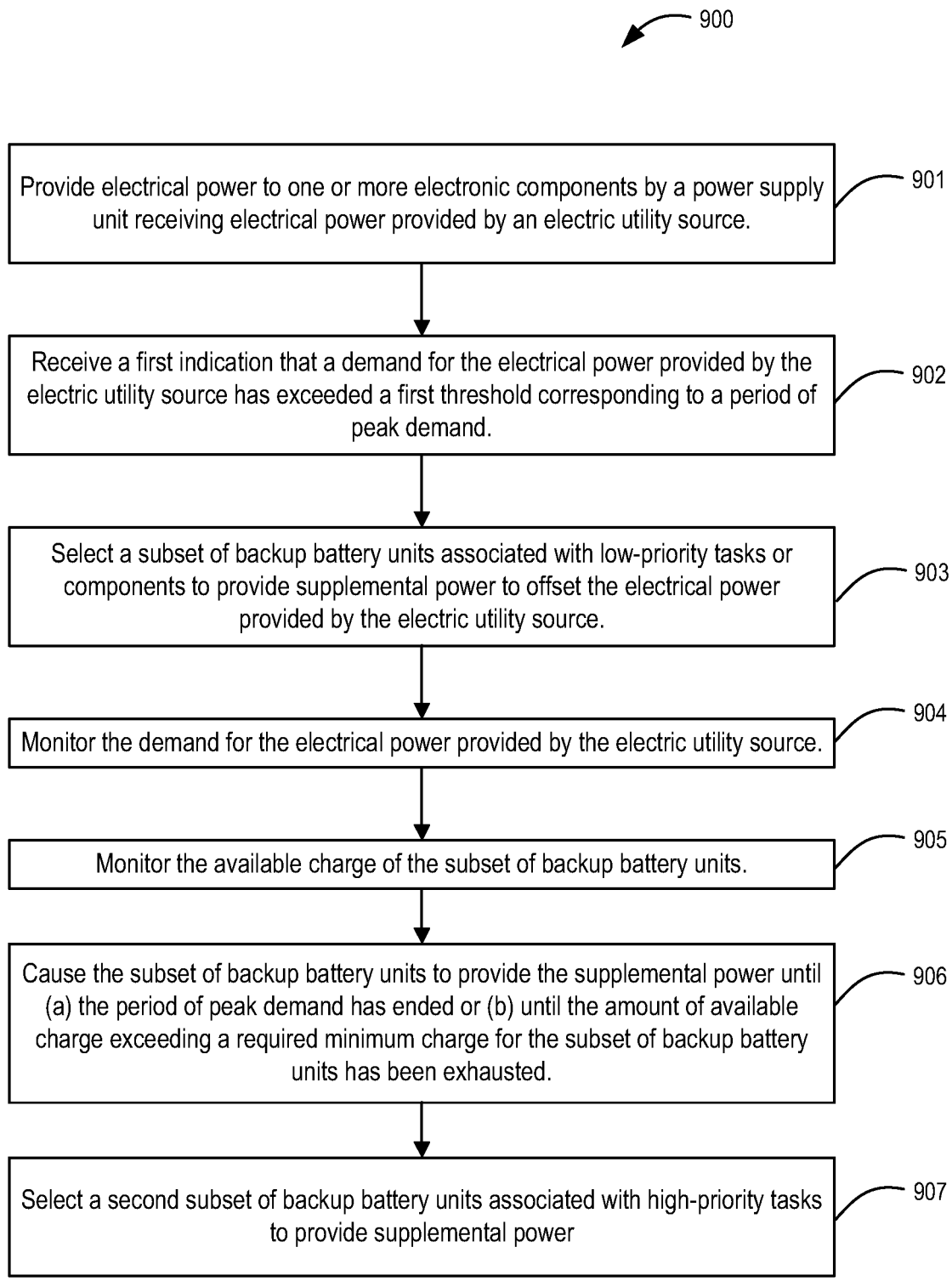

BATTERY MITIGATED DATACENTER POWER USAGE

BACKGROUND

A datacenter typically contains a collection of computer servers and components for the management, operation, and connectivity of those servers. Power is generally supplied to such components by sources of externally-supplied power, and can also be provided by short-term backup power solutions such as backup battery units (BBUs) or supercapacitors to prevent data loss during power loss events. Externally-supplied power often includes a high-voltage AC power source, provided by municipality or regional power providers, that is converted to DC power and stepped appropriately in current and voltage before it can be utilized by most datacenter components. Externally-supplied power is also used to charge the various short-term backup power solutions in the datacenter. Thus, as datacenters continue to grow in size, there is significant interest in improving their overall efficiency and power usage.

BRIEF DESCRIPTION OF THE DRAWINGS

Various embodiments in accordance with the present disclosure will be described with reference to the drawings, in which:

FIG. 9 illustrates a third example of a process 900 for managing backup power sources to manage power draw from an external, utility-provided AC power source, in accordance with various embodiments.

DETAILED DESCRIPTION

Figure 1:
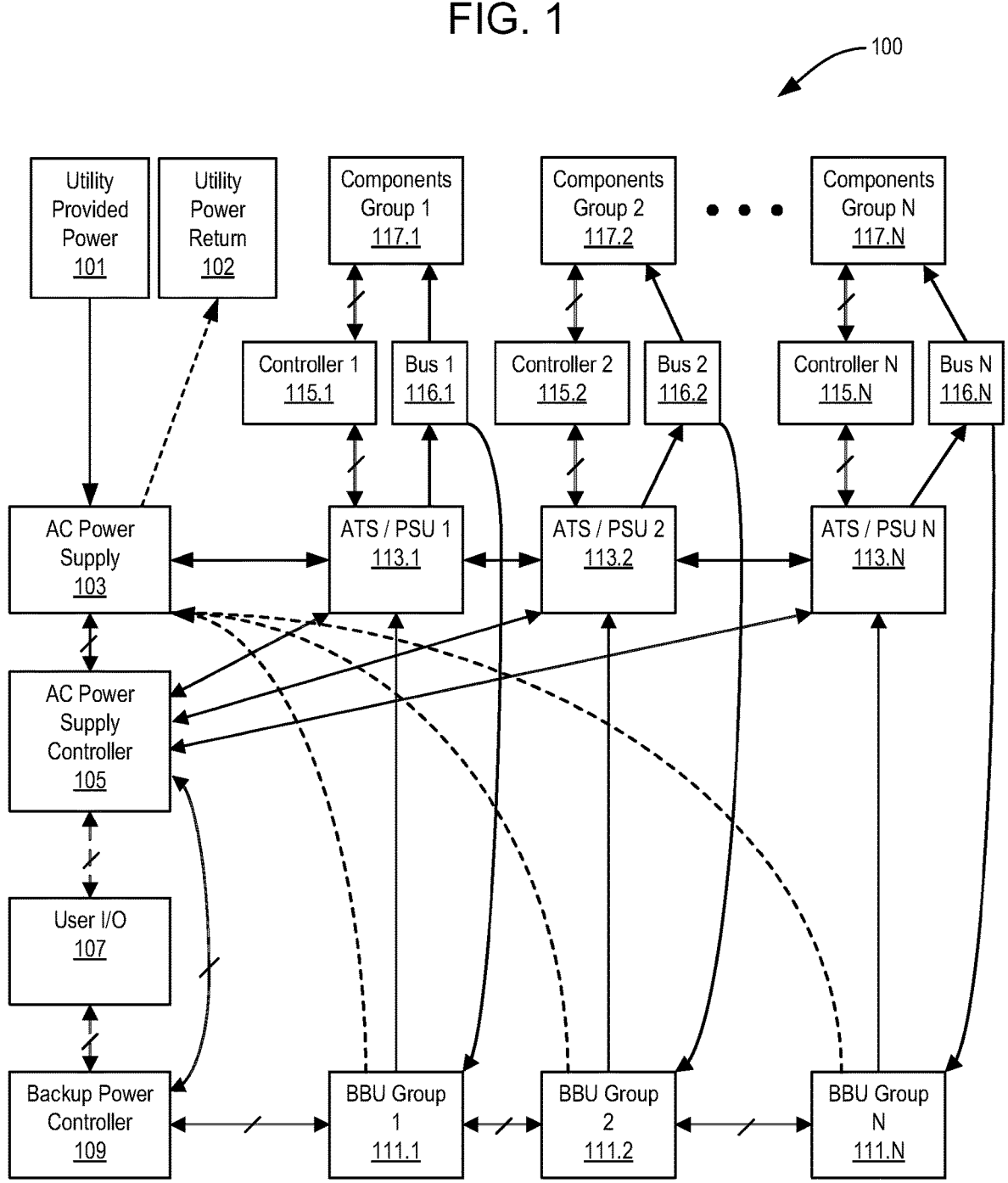
FIG. 1 is a high-level block diagram illustrating a system for distributing utility-provided power and backup battery power to electronic components, in accordance with various embodiments.

In a modern datacenter, the continuity of power to servers and other electronic components can be maintained by employing redundant power supplies, including backup battery units (BBUs) and/or supercapacitors (SC), in combination with continuous power supplies such as externally-supplied high-voltage AC power that is routed through and conditioned at power supply units (PSUs). Due to the high power demands of datacenters, and the unpredictable nature of line power outages, backup power supplies in a modern datacenter are well-distributed through the datacenter architecture, have large capacities, and are routinely discharged and charged to verify capacity. Likewise, PSUs in a modern datacenter are distributed, may be capable of rapid and safe line-switching between multiple sources, and can handle large output loads.

Significant effort goes into the maintenance of backup systems, as the continuity of server uptime is essential for businesses relying on cloud services or systems provided by servers in the datacenter. Therefore, backup systems that include BBUs are subject to stringent requirements for minimum BBU capacity, total BBU capacity, and redundancy. For example, in some datacenter systems, servers at the rack level can be powered by groups of BBUs that employ at least N+1 redundancy, meaning that an additional BBU is maintained in a charged state beyond the number of charged BBUs necessary to power the servers. Substantial excess charge may be available in the backup battery units associated with any rack beyond a minimum charge required to ensure continuous operation in the event of utility power loss. In a datacenter having distributed backup battery units serving a networked power supply system, hundreds and potentially thousands of backup battery units may be available at any given time to supplement power provided by a utility power source.

Embodiments described herein are directed to methods and systems of managing the discharging and charging functions of BBUs distributed in a datacenter power supply network over time, based on the demand for and cost of externally-supplied AC power. In addition, various embodiments are directed to methods of monitoring the demand of external AC power and selecting BBUs for discharge during periods of high demand, in order to either offset consumption or to reverse consumption and thus resupply power to the external source. Further embodiments are directed to methods of monitoring the demand for externally-supplied AC power and selecting BBUs for recharge during periods of low demand, in order to balance power demands on local infrastructure and to efficiently utilize supplied power.

For example, according to some embodiments, a power supply controller in a power supply system of a datacenter can monitor the demand for AC power from the local grid. At the beginning of a peak power demand period, during which the demand for utility AC power utilities is highest, the power supply controller can instruct BBUs in the datacenter that are fully charged to discharge some power back to the power supply system in order to offset the datacenter's need for utility-provided power. In some cases, the amount of power that is discharged by the BBUs in the datacenter can temporarily exceed the power demands of the datacenter, in which case power can be supplied back to the utility or to other external parties. Likewise, when a low-demand period begins (e.g., at night) the power supply controller can selectively instruct partially-discharged BBUs to draw power from the local utility provider in order to recharge. This functionality can ease the burden of the datacenter on the local power utility, mitigating power shortages or smoothing unpredictable demand. In some cases, the ability to offset utility-provided power on demand can allow the datacenter to compensate for unexpected utility shortfalls, functionally offset the negative effects of stochastic power availability (e.g., from wind and/or solar power), or allow local utility providers to maintain a more consistent and efficient energy mix over time. In some cases, electric utility providers will adjust the cost of supplied power during the day to correspond to demand, as a tool to encourage power use outside of peak demand hours. In such cases, the ability to offset utility-provided power on demand can also allow the datacenter to reduce operational costs by discharging stored electricity during peak hours, and recharging during lulls in demand.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 is a high-level block diagram illustrating a system 100 for distributing utility provided power 101 and backup battery power stored in backup battery units 111 to electronic components 117, in accordance with various embodiments. The utility provided power 101 can include a supply of high voltage AC power connected to the system 100, which can be a datacenter, or other comparable commercial or industrial facility. The utility provided power 101 can be routed through an AC power supply 103 under the control of an AC power supply controller 105, which can be one computing device or can include distributed AC power supply controllers configured to determine power requirements and supply AC power as needed to power supply units 113 throughout the system 100.

The AC power supply can step down and condition the high-voltage utility provided power 101 for routing to any suitable number 'N' of automatic transfer switches and power supply unit assemblies ATS/PSUs 113.1, 113.2, to 113.N. Each ATS/PSU 113 corresponds to a power shelf controller 115, e.g., controller 115.1, 115.2, and 115.N, that manages the power supplied by each PSU and distributes the supplied power to respective groups of electronic components 117.1, 117.2, to 117.N via a corresponding power bus 116.1, 116.2, 116.N, which may be organized individually, at the rack level, or according to any other suitable grouping. Each PSU 113 is also electrically connected with a corresponding backup battery unit (BBU) of a number of N groups of backup battery units 111.1, 111.2. 111.N, which can supply power to each ATS/PSU 113 in order to compensate for or supplement the utility-provided power in the event of power loss, inconsistency, or excess demand. Backup battery units 111 can be recharged via utility-supplied power provided to the ATS/PSU's, which may be provided directly or indirectly, e.g., via the corresponding power bus 116 of each respective ATS/PSU 113. Groups of backup battery units 111 are assembled of multiple backup battery units for each group of electronic components 117, typically according to at least N+1 redundancy based on the power availability of the backup battery units and the power requirement of the corresponding group of electric components. According to various embodiments, each group of backup battery units 111 may contain six backup battery units, though a group can contain more or fewer.

According to various embodiments, the backup battery units 111.1, 111.2. 111.N can be managed at either the power shelf level by power shelf controllers 115.1, 115.2, 115.N, or can be controlled by a separate backup power supply controller 109. The backup power supply controller 109 or the power shelf controllers 115 can coordinate with the AC power supply controller 105 to coordinate distribution of AC power from the AC power supply 104 while distributing, or alternating with, battery power from the groups of backup battery units 111. Any suitable number of user input/output devices 107 can be used by agents to provide inputs to the system 100, including but not limited to: instructions indicative of the timing or threshold demand associated with a peak demand period for the utility provided power 101, instructions to discharge backup battery units to offset utility provided power, instructions to charge backup battery units, or other instructions. When the backup battery units 111 are instructed to discharge power to offset utility provided power, the additional supplied power can be routed via the AC power supply 103 to power other groups of electronic components 117, e.g. by offsetting power at the local ATS/PSU 113, or by supplying power along a separate circuit to the AC power supply 103. In some embodiments, excess power can be sold or provided externally, e.g. via a utility power return 102 for providing power either back to the utility provider or to other third parties.

Figure 2:
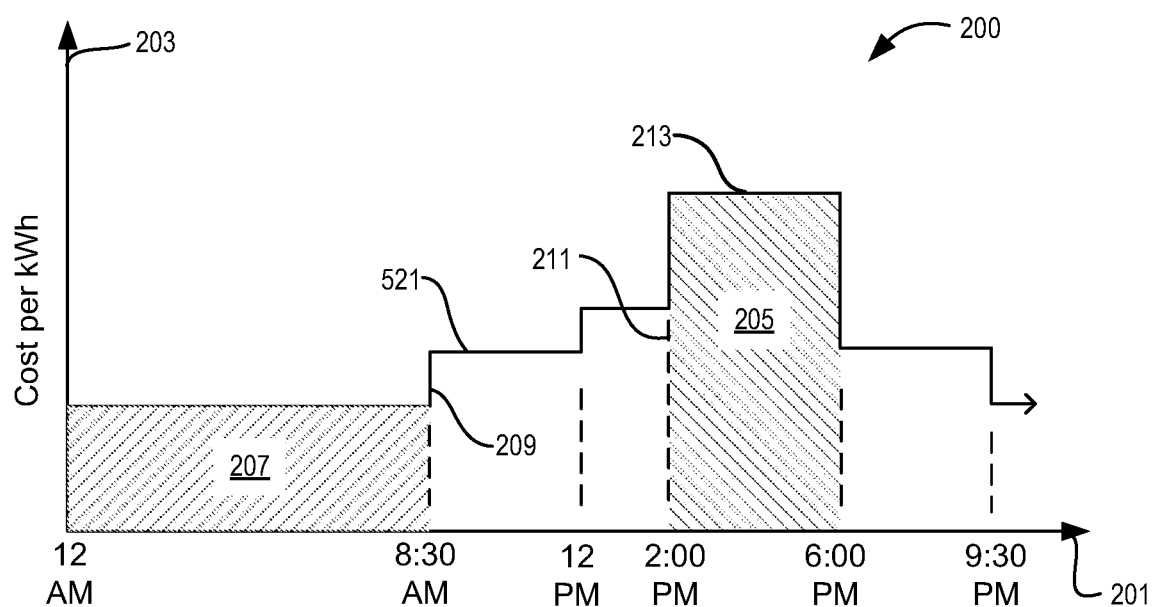
FIG. 2 is a graphical representation illustrating one example of utility-provided power cost over time.

The systems described herein operate under conditions of changing demand and pricing for utility-provided power, as shown in FIG. 2. FIG. 2 is a graphical representation 200 illustrating one example of utility-provided power cost over time, in which the x axis 201 illustrates the time of day, and they axis 203 illustrates a proportional estimate of the cost per kWh of utility-provided electrical power, and the instantaneous cost of power 221 varies over time during the day. The specific profile of utility power cost varies region-by-region, but in general, a period of peak demand 205 occurs during the day, when use by the industrial and commercial sectors overlaps with use by individual consumers. The peak cost 213 of utility-provided power corresponds in part to the way that utilities meet demand by bringing online additional generators or purchasing power from adjacent utilities. In some utility districts, costs of utility-provided power can vary at a more granular level, depending on changes in demand during the course of the day. In general, a period of low demand 207 occurs at night, when few industrial or commercial facilities are operating and during which most individual consumers are asleep, and ends at the beginning of the workday 209. The cost of utility-provided power closely tracks usage, and the cost can in some cases be used to estimate instantaneous demand.

Figure 3:
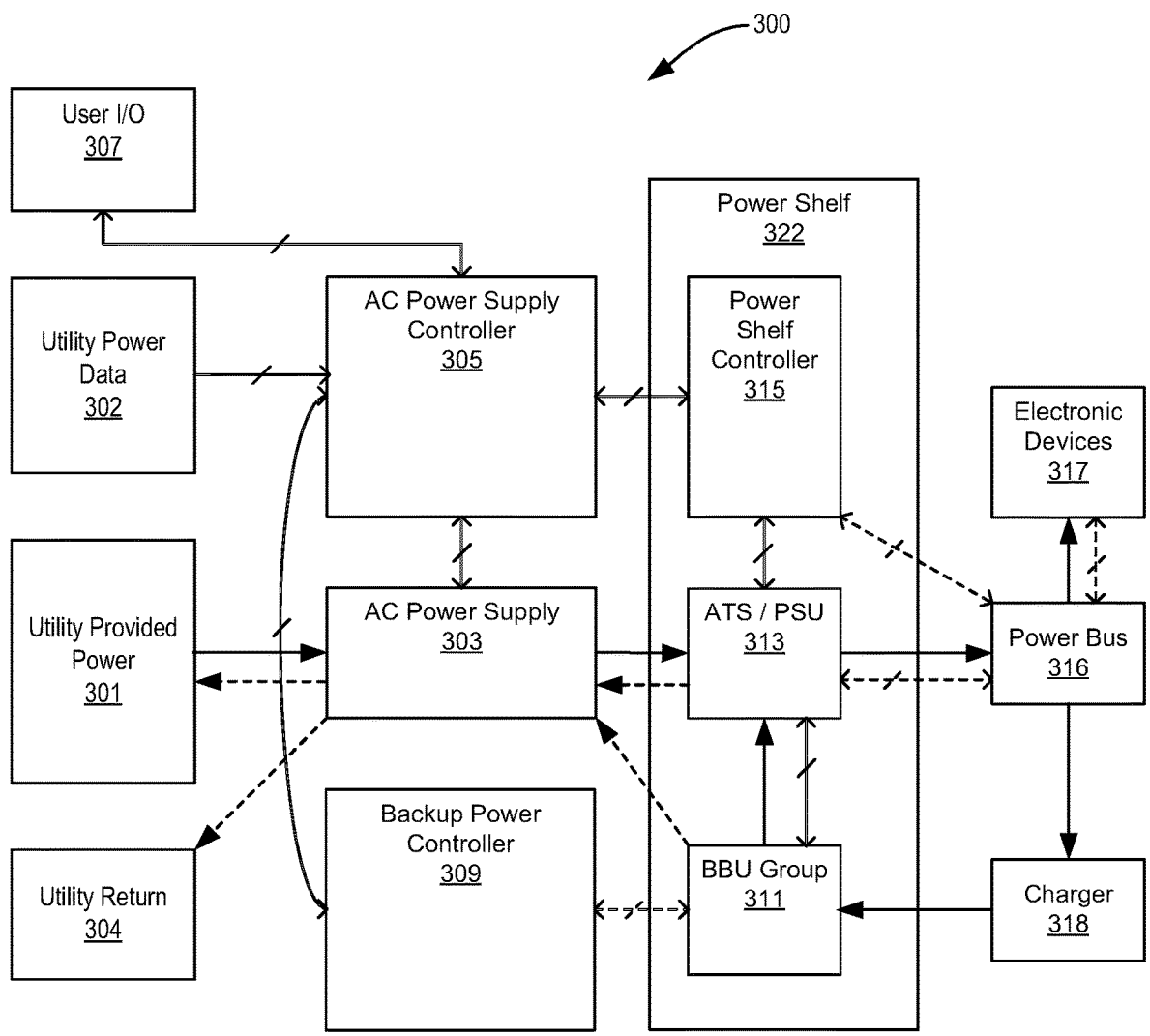
FIG. 3 is a block diagram illustrating an example approach to distributing utility-provided power and backup battery power to electronic components, in accordance with various embodiments.

FIG. 3 is a block diagram illustrating an example system 300 for distributing utility-provided power and backup battery power to electronic components according to a first, simplified approach, in accordance with various embodiments. In this approach, high voltage utility power 301 is provided to the system 300 via an AC power supply 303, which is configured to step down the high voltage and distribute power at lower AC voltages to any suitable number of power shelves 322. The distribution of AC power can be controlled by an AC power supply controller 305, which centralizes the allocation of power across the system 300; or the distribution of AC power can be determined locally by the power shelf controllers 315 associated with each power shelf 322.

According to various embodiments, the AC power supply can provide AC power at a suitable voltage to each power shelf 322 by way of an ATS/PSU 313, which steps, conditions, and converts the AC power to DC for distribution to various electronic devices 317 served by the power shelf 322. The power supplied via the ATS/PSU 313 can be routed to the electronic devices 317 by way of, e.g., a power bus 316 that can serve one, several, or potentially many electronic devices (e.g. servers, networking devices, or the like). Power distribution by the power bus 316 can be governed directly or indirectly by the ATS/PSU 313, the power shelf controller 315, by the electronic devices 317 served by the power bus, or by any suitable combination thereof. The power bus 316 can be the primary direct source of power for recharging the BBU group 311 with which the ATS/PSU 313 is associated. For example, excess power supplied to the power bus 316 by the ATS/PSU 313 can be routed to a charger 318 for recharging backup battery units of the BBU group 311. According to some embodiments, the utility-provided power 301 may be three-phase power, which can be stepped and converted from three-phase to two-phase or single-phase power by the AC power supply 303 when provided to the ATS/PSU 313, or may be converted at the ATS/PSU.

Each ATS/PSU 313 is also electrically connected with a collection of backup battery units 311 configured to store electrical power in order to power the electronic devices 317, via the ATS/PSU 313, in the event of a utility power outage. The backup battery units 311 can be controlled via a power shelf controller 315, or can be controlled directly by a backup power controller 309 that is configured to coordinate the use of backup battery units throughout the system 300, in conjunction with the AC power supply controller 305. According to various embodiments, the AC power supply controller 305 can cause the system to partly, or fully, switch between utilizing utility provided power 301 and backup power stored by the distributed backup battery units 311.

During normal operation, the AC power supply 303 draws power from the utility provided power source 301, which is then provided to the ATS/PSU 313 for further distribution to the electronic devices 317. When the backup battery units 311 are at low charge, some power from the AC power supply 303 can be diverted by the ATS/PSU for charging the backup battery units 311, e.g. via the power bus 316 and charger 318. In contrast, during a period of peak demand, the system 300 can configure the backup battery units 311 to discharge in order to provide supplemental power back upstream to the AC power supply 303, either directly or routed through the ATS/PSU 313, where the supplemental power can be distributed for use throughout the system 300. In some embodiments, such as where the system 300 stores excess power beyond what is needed to power the electronic components, excess supplemental power can be further distributed or sold back to the utility power source 301 or a utility return 304 that can offset demand on the electric utility by external third-parties or other facilities. Finally, during a period of low demand, the system 300 can configure the backup battery units 311 to charge from the utility provided power 301 as it is distributed by the AC power supply to the power shelf 322.

The system can determine whether to provide supplemental power, or whether to draw excess utility provided power for recharging backup battery units, based on several factors. For example, according to some embodiments, the provider of the utility-provided power can provide utility power data 302 indicative of the demand and/or cost of electrical power over time, and the AC power supply controller 305 (or other suitable controller) can determine the period of peak power demand and a corresponding time to begin providing supplemental power based on the utility power data, or can determine a period of minimal power demand also based on the utility power data. Alternatively, a predetermined period of peak power demand or minimal power demand can be set via manual input by an agent through a user input/output device 307.

Figure 4:
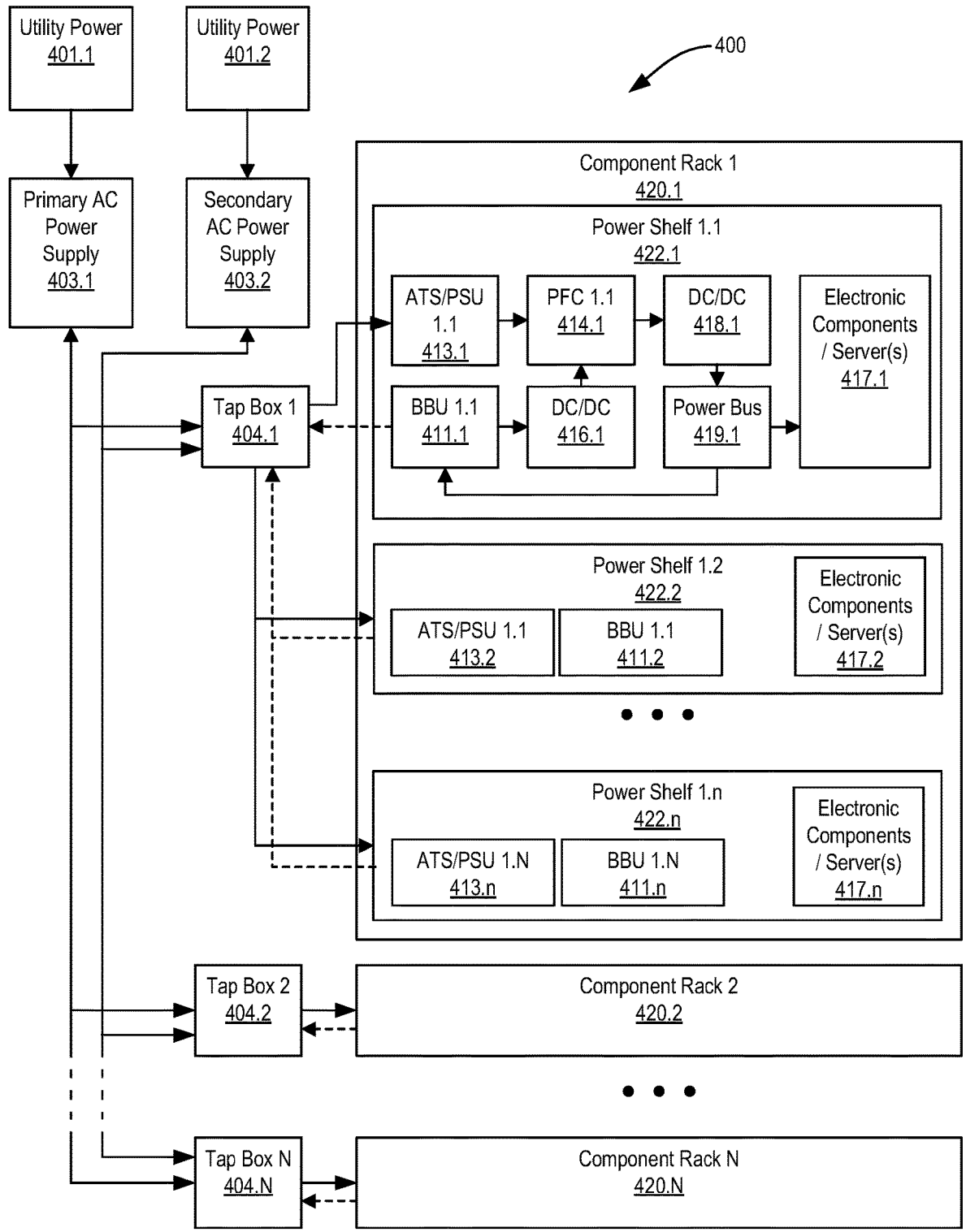
FIG. 4 is a block diagram illustrating a second example approach to distributing utility-provided power and backup battery power to electronic components, in accordance with various embodiments.

FIG. 4 is a block diagram illustrating an example system 400 for distributing utility-provided power and backup battery power to electronic components according to a second example approach, in accordance with various embodiments. In this approach, two or more high voltage utility power supplies 401.1, 401.2 are provided to the system 400 via a primary AC power supply 403.1 and a secondary AC power supply 403.2, respectively. The AC power supplies 403 are configured to step down the high voltage and distribute power at lower AC voltages to any suitable number of component racks 420. The distribution of AC power to each component rack 420, and the portion distributed by each of the utility power supplies 401.1, 401.2, can be controlled by respective tap boxes 404 connected with each component rack 420.

According to various embodiments, each one of the primary AC power supply 403.1 and secondary AC power supply 403.2 can provide AC power at a suitable voltage to each of up to 'N' component racks 420.1, 420.2, 420.N by way of respective tap boxes 404.1, 404.2, 404.N. Each respective tap box 404 can split and optionally condition the AC power for distribution to various elements in each component rack 420. For example, according to various embodiments, power from either the primary AC power supply 403.1 or the secondary AC power supply 403.2 can be selectively diverted by tap box 404.1 to provide utility power to ATS/PSUs 413.1, 413.2, up to 413.*n*; and to provide power to each group of backup battery units 411.1, 411.2, up to 411.*n* for each one of 'n' power shelves 422.1, 422.2, 422.*n*. Each other respective tap box, 404.2 to 404.N can similarly provide power to components of other respective component racks 420.2 to 420.N.

Taking power shelf 422.1 as an example, the ATS/PSU 413.1 can provide electrical power to the electronic components and/or servers 417.1 via one or more conditioning steps, e.g., power factor correction 414.1 and a DC/DC step 418.1. The electrical power supplied by the ATS/PSU can be distributed among one or among any suitable number of electronic components 417.1 via a power bus 419.1, which can also provide power for recharging the BBU's 411.1 associated with each respective ATS/PSU. In the event of power loss, the collection of backup battery units 411.1 can provide electrical power via DC/DC step 416.1, power factor correction 414.1, and the subsequent DC/DC step 418.1, under the control of one or more controllers as described above with reference to FIGS. 1 and 3, e.g., global controllers similar to AC power supply controller 305 and backup power controller 309 (FIG. 3) or controllers associated with each power shelf 422 similar to power shelf controller 315 (FIG. 3). This distributed power supply system, and similar, provide for direct access by each group of backup battery units 411 to provide supplemental power downstream to their respect electronic components 417, or to provide supplemental power upstream, via tap boxes 404, to offset the power supplied by one or both of the primary AC power supply 403.1 and secondary AC power supply 403.2. Thus, using a distributed system, backup battery power can be routed upstream more directly to offset either a primary AC power supply 403.1 or a secondary AC power supply 403.2, regardless of the location of each backup battery unit in the system.

Based in any of the power distribution systems described above, switching from utility-provided power during a period of peak demand to battery power results in time-shifting the consumption of utility-provided power, typically to a period of weak or minimal power demand.

Figure 5:
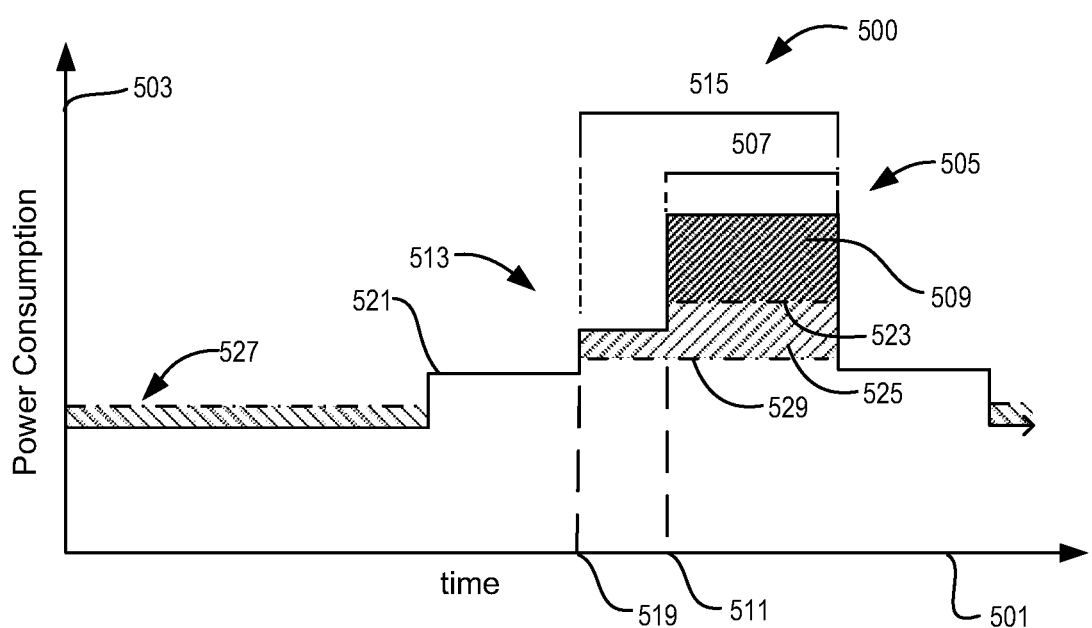
FIG. 5 is a graphical representation illustrating a first approach to time-delaying consumption of utility-provided power by way of discharging and charging backup battery units to compensate for demand on the utility-provided power, in accordance with various embodiments.

This time-shifting can be achieved in several ways, for example, FIG. 5 is a graphical representation 500 illustrating a first approach to time-delaying consumption of utility-provided power by way of discharging and charging backup battery units to compensate for demand on the utility-provided power, in accordance with various embodiments. The x axis 501 illustrates the time of day, and the y axis 503 illustrates a proportional estimate of the power consumption associated with operating the electronic devices according to any of the systems disclosed herein. Thus, the amount of power consumption 521 varies over time during the day. The graphical representation closely maps the price of utility-provided power over time as shown in FIG. 2, however, actual power consumption curves may include significantly higher variation and non-step consumption curves.

According to various embodiments, a period of peak demand 505 occurs during the day, beginning when power consumption spikes at 511. A selection of distributed backup battery units can be discharged gradually, for a duration 507 of the period of peak demand. The backup battery units may be discharged in a sequential manner that offsets demand for the utility provided power by providing supplemental power 509, dropping the effective consumption of utility-provided power locally to a reduced consumption level 523.

According to some embodiments, backup battery units may have sufficient charge to offset demand for utility-provided power outside of a nominal period of peak demand 513. For example, a larger quantity of supplemental power 525 can be spread over a larger duration 515 that precedes the nominal period of peak demand, e.g., starting at an earlier increase 519 in power demand, and further reducing the effective consumption of utility-provided power locally to a further reduced consumption level 529. Utility power saved while supplemental power is supplied by the backup battery units can be harnessed to charge depleted backup battery units during a period of low demand 527.

Figure 6:
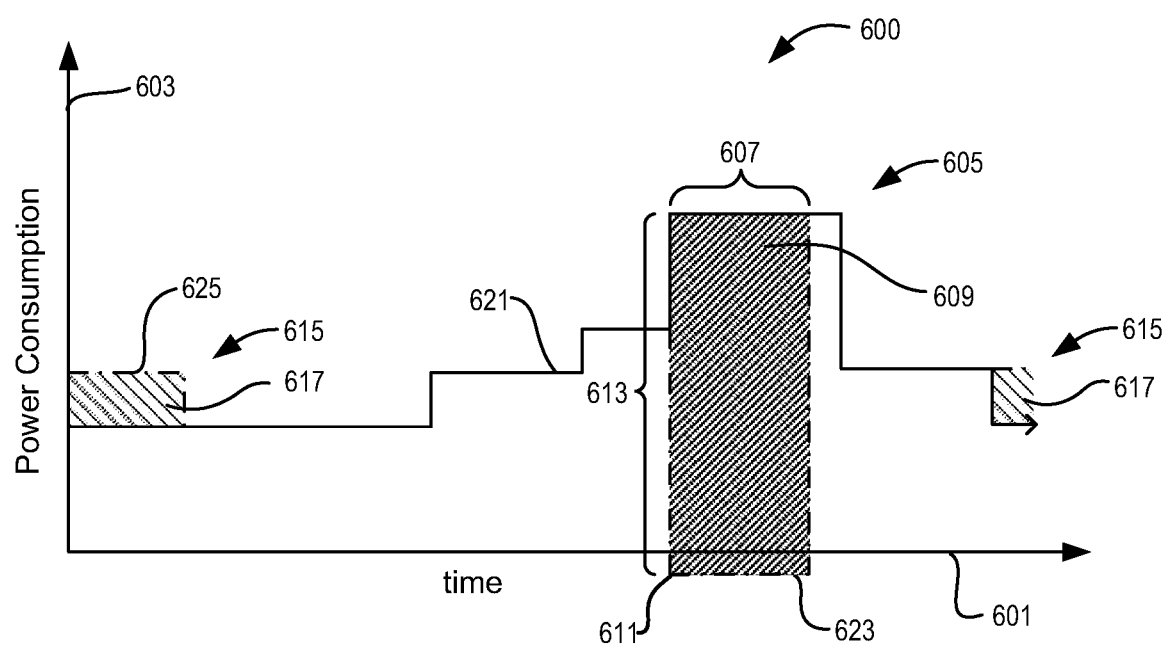
FIG. 6 is a graphical representation illustrating a second approach to time-delaying consumption of utility-provided power by way of discharging and charging backup battery units to compensate for demand on the utility-provided power, in accordance with various embodiments.

FIG. 6 is a graphical representation illustrating a second approach to time-delaying consumption of utility-provided power by way of discharging and charging backup battery units to compensate for demand on the utility-provided power, in accordance with various embodiments. The x axis 601 illustrates the time of day, and the y axis 603 illustrates a proportional estimate of the power consumption associated with operating the electronic devices according to any of the systems disclosed herein. Thus, the amount of power consumption 621 varies over time during the day. The graphical representation closely maps the price of utility-provided power over time as shown in FIG. 2, however, actual power consumption curves may include significantly higher variation and non-step consumption curves.

According to various embodiments, a period of peak demand 605 occurs during the day, beginning when power consumption spikes at 611. A selection of distributed backup battery units can be discharged, for a duration 607 based on the availability of excess backup power among the distributed backup battery units. The backup battery units may be discharged in a manner that not only offsets demand for the utility provided power, but may exceed the overall power consumption of the system for a limited period of time, by providing supplemental power 609, dropping the effective consumption of utility-provided power locally by an amount 613 to a reduced consumption level 623. Conversely, during a lull or a period of low demand 615, backup battery units can be charged by drawing on utility-provide power 617 and thus temporarily increasing the rate of utility power consumption 625, albeit during a period of time where the cost of utility-provided electrical power is minimized.

Figure 7:
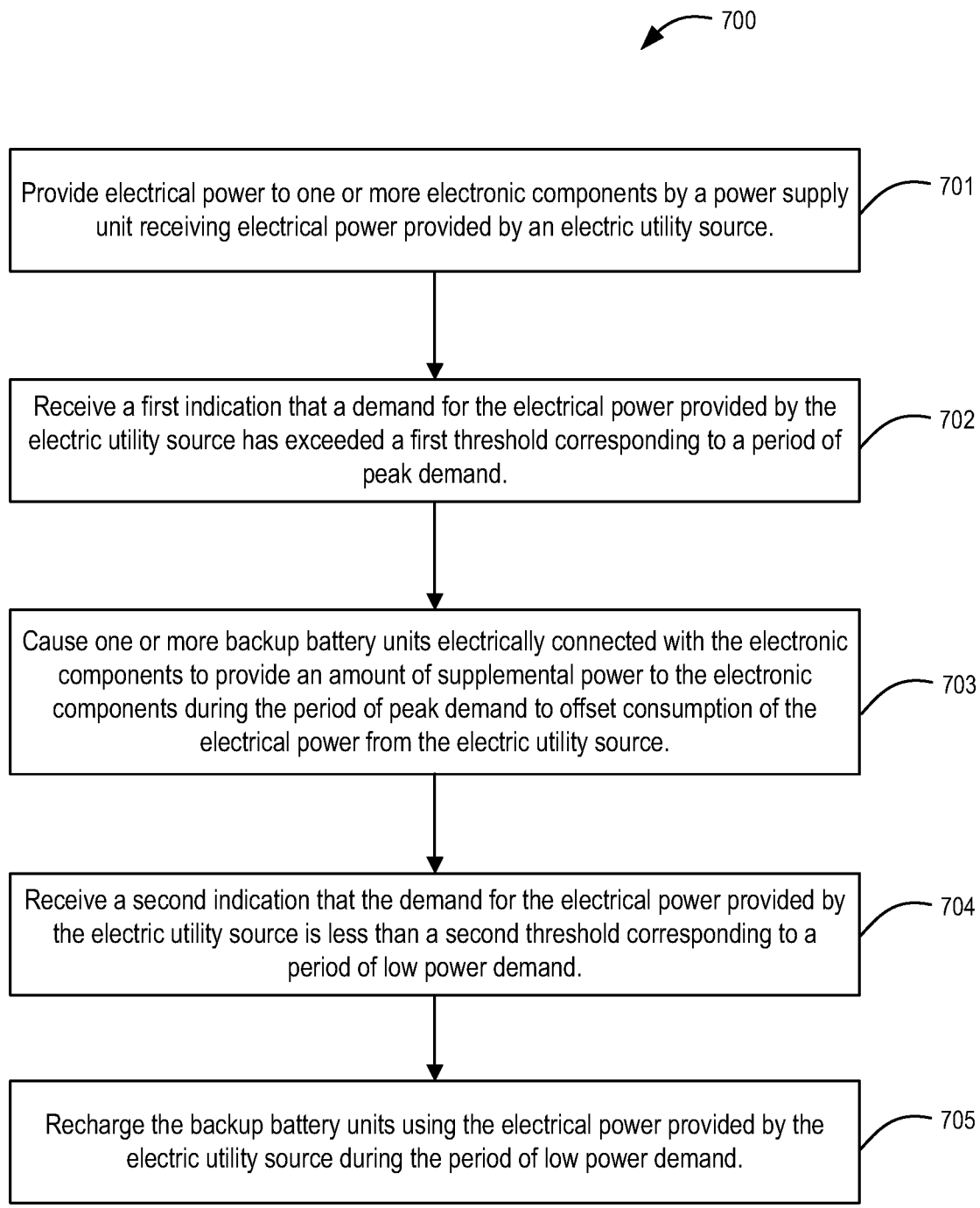
FIG. 7 illustrates a first example of a process 700 for managing backup power sources to manage power draw from an external, utility-provided AC power source, in accordance with various embodiments.
Figure 8:
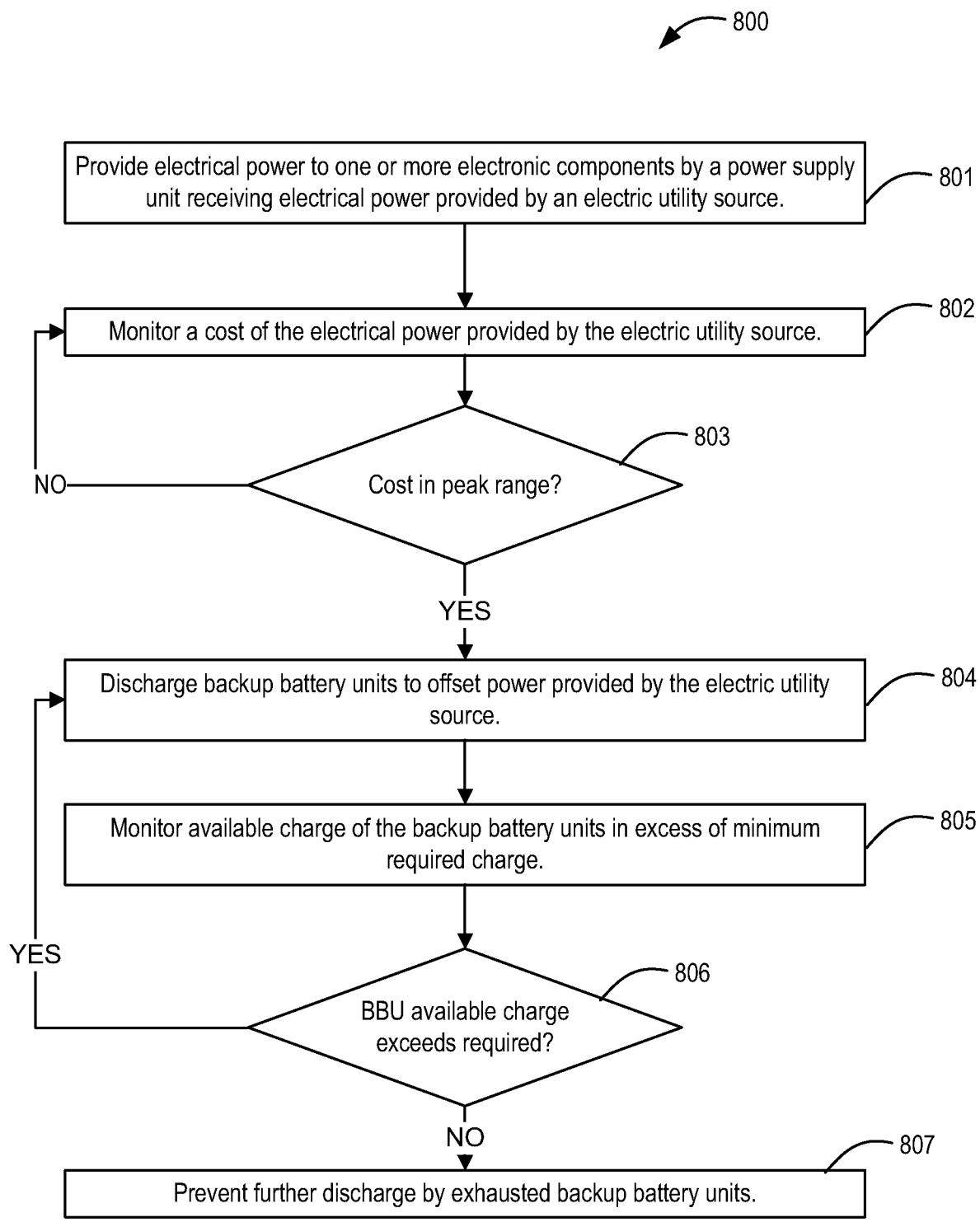
FIG. 8 illustrates a second, more granular example of a process 800 for managing backup power sources to manage power draw from an external, utility-provided AC power source, in accordance with various embodiments.

FIGS. 7-9 illustrate various examples of processes for managing backup power sources to manage power draw from the external AC power source, to improve overall efficiency of the datacenter. Some or all of the processes 700, 800, or 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Except where explicitly contraindicated, process steps of any process described herein may be performed in conjunction with or substituted with process steps of any other process described herein.

FIG. 7 illustrates a first example of a process 700 for managing backup power sources to manage power draw from an external, utility-provided AC power source, in accordance with various embodiments. First, a control system can provide electrical power to one or more electronic components by a power supply unit receiving electrical power provided by an electric utility source. (Act 701). The electronic components can be, for example, servers, data storage devices, power conditioning devices or switches, networking devices, or any other suitable component of a datacenter, or components of other commercial or industrial facility.

During operation, demand on the utility source may vary. In some cases, this may include daily variation caused by consumer demand on a local utility or power grid. In some other cases, demand may be driven by increasing power consumption of the electronic components associated with the system. In yet other cases, demand may be driven by power availability, such as stochastic power availability caused by variation in the production of local renewable energy by solar, wind, hydroelectric, or other energy sources; such that power demand is high when available supply is low. Power demand can be described in terms of a strict power requirement, e.g., an amount of instantaneous power (kW) required to maintain operation of the electronic components, in terms of power supply required over a subsequent time period (kWh), or may be characterized by a provider-enforced price of power, which may be an instantaneously variable price depending on supply and consumption, or may be a periodically variable price set based on predicted supply and consumption. When the utility-provided AC power source is in high demand, the system can receive an indication that demand for the utility-provided electrical power has exceeded a first threshold. (Act 702). The first threshold can correspond to power consumption that exceeds a predetermined consumption level, to power consumption exceeding a predetermined percentage of power availability (in the case of variable supply), or to a period of time during which the cost of electrical power from the utility has passed a cost threshold. This threshold can also be described as beginning a period of peak demand.

During a period of peak demand, the system can cause one or more backup battery units electrically connected with the electronic components to provide an amount of supplemental power to offset consumption of the electrical power from the electric utility source. (Act 703). According to some embodiments, the amount of stored charge provided to offset consumption of electrical power from the electric utility source can be provided gradually, by recruiting a subset of backup battery units distributed across the system, periodically exhausting individual backup battery units by reducing the amount of excess stored power to a reserve level, and switching from exhausted backup battery units to additional backup battery units that have excess stored power in order to maintain a consistent power supply offset. The system can also remove selected backup battery units from use providing supplemental power when any backup battery unit fails to meet specified conditions, e.g., an over-temperature condition whereby discharging causes the backup battery unit to increase in temperature beyond nominal range, or when a backup battery unit at full charge has insufficient excess charge above the required reserve.

In a datacenter environment, for example, some individual backup battery units may have a reserve charge requirement on the order of 50-300 Wh; and when new, may have a fully charged capacity ranging from about 600 Wh to 800 Wh, or higher. As the demand for datacenter services continues to grow and as battery technology improves, with concomitant increases in power demand, backup battery units in future datacenter applications may have significantly more capacity than backup battery units today. Thus, the available charge of any given backup battery unit can vary from 50 Wh, for older batteries that are at end-of-life or for previously discharged batteries, and may exceed 300 Wh, 800 Wh, or more, for backup battery units early in their life-cycle and at full charge.

FIG. 5, for example, illustrates an example of power consumption offset that is managed over time. According to some embodiments, the rate at which capacity to supplement utility-provided power from backup battery units can be staged in deployments of finite power, e.g., steps of 5 kW increments, 10 kW increments, 15 kW increments, or other suitable increment based on adding or subtracting backup battery units from a subset of backup battery units contributing to the power consumption offset. Alternatively, the amount of stored charge provided to offset consumption of electrical power can be discharged rapidly during a period of peak demand, as shown in FIG. 6, in order to substantially decrease the cost of electrical power provided by the electric utility source. In some embodiments, the amount of stored charge can be sufficient to not only offset, but to reverse consumption of electrical power from the electric utility source, such that provided backup power can be sold back to the electric utility source.

According to some embodiments, the system can set a threshold for determining whether a peak demand period has begun based on the cost of utility-provided power off-peak or during a low-demand period. For example, a BBU has a non-unity charging efficiency from utility-provided AC power (e.g., approximately 98%) and a non-unity discharge efficiency associated with providing supplemental power (e.g., approximately 95%), thus some power is lost by switching from utility-provided AC power to BBU-provided supplemental power. In other words, offsetting an amount of utility-provided AC power requires, at a later time, consuming a slightly larger amount of utility-provided AC power to recharge the utilized backup battery units. However, due to increased power availability during off-peak periods, the overall cost of the consumed utility-provided AC power can be substantially less when consumption is time-delayed using the backup battery units, as the time-delayed portion of the power consumption occurs during a period of reduced demand and reduced cost.

By way of one illustrative example, a 1 MW datacenter facility may operate on utility-provided AC power that routinely varies in cost from a maximum of approximately $0.1/kWh during a period of peak demand during the middle of the day, to a minimum of approximately $0.05/kWh during an overnight lull in demand. Even if the efficiency losses for recharging the backup battery units in the datacenter facility amount to 20%, (a high approximation not to scale,) each MWh offset during the period of peak demand will immediately save $100, and can be replaced by recharging the backup battery units at the rate of approximately $62.5 ($50/MWh, with 20% efficiency losses). Noting that instantaneous cost of utility power is often tied to instantaneous demand, minimizing overall cost of consumption can be directly tied to minimizing the environmental impact of power consumption. For example, in some cases, the overall environmental impact of the time-delayed power consumption can be less that the environmental impact of utilizing only utility-provided AC power on demand, as power generation during low-demand periods typically falls to base-load facilities that operate at high power generation efficiencies, whereas power generation during high-demand periods typically requires that utilities bring online nimble but less-efficient power generation facilities.

When the utility source is in low demand, e.g. at night, during minimal usage of electronic components, or when a supply of power is otherwise readily available, the system can receive a second indication that the demand for the electrical power provided by the electric utility source is less than a second threshold corresponding to a period of low power demand. (Act 704). This second threshold can correspond to power consumption that falls below a predetermined consumption level, to power consumption falling below a predetermined percentage of power availability (in the case of variable supply), or to a period of time during which the cost of electrical power from the utility is at a local minimum level. This threshold can also be described as beginning a demand lull or a period of low demand. During the period of low demand, the system can cause some or all of the fully or partially discharged backup battery units to recharge using power provided by the electric utility source. (Act 705).

According to various embodiments, the management of power supplied by discharging backup battery units to offset utility power can be performed based on an iterative process that includes monitoring utility power demand or cost, and monitoring the availability of stored electric power across the backup battery units in order to maximize the benefit of utilizing backup battery power during peak power demand and to maintain safe power availability in the backup battery units. For example, FIG. 8 illustrates a second, more granular example of a process 800 for managing backup power sources to manage power draw from an external, utility-provided AC power source, in accordance with various embodiments.

First, the system can provide electrical power to one or more electronic components by a power supply unit receiving electrical power provided by an electric utility source, as described above with reference to FIG. 7. (Act 801). The system can monitor a cost of the electrical power provided by the electric utility source in order to detect variations in power cost, or to detect variations in power demand that correspond to changes in cost. (Act 802). According to some embodiments, the system can utilize previously obtained power supply data to determine a pattern of consumption, and can predict variations in power demand or power cost based on the previously obtained data. According to some alternative embodiments, monitoring can be achieved by receiving data periodically or continuously from the provider of the electric utility source, including automated provision of power supply data, or user-generated information indicating, for example, a time at which a peak demand period begins, at which the utility sets a peak rate, or at which a peak demand period is expected to begin based on historical data.

When the system detects that the cost of electrical power is within a peak cost range, or that an associated power demand is within a peak demand range, (act 803) the system can select backup battery units for providing supplemental power, and discharge the selected backup battery units to offset power provided by the electric utility source. (Act 804). While any backup battery unit is discharging, the system can continuously, or periodically, monitor the available charge of the backup battery unit in excess of a minimum required charge for that backup battery unit. (Act 805). Provided the excess or available charge for the backup battery unit exceeds the minimum required charge, (act 806) the system can continue to discharge the backup battery unit along with a subset of backup battery units to provide the supplemental power, as needed, though individual backup battery units can be removed from the discharge cycle in order to reduce the rate at which power is supplied, or additional backup battery units can be added to the discharge cycle in order to increase the rate at which power is supplied. In the event that any backup battery unit is exhausted by discharging down to the minimum required charge, the exhausted backup battery unit can be prevented from further discharging power. (Act 807). If a replacement backup battery unit is available and retains excess available charge, the system can add the additional backup battery unit to the discharge cycle to maintain a consistent rate of supplying supplemental power.

According to various embodiments, the management of power supplied by discharging backup battery units to offset utility power can be performed with deference to the functions of individual backup battery units in addition to their available stored charge. For example, in some embodiments, backup battery units or groups of backup battery units can be selected for providing supplemental electrical power based on their available charge, which can be individual to the backup battery unit, and based on a relative priority of the electronic components to which they are connected. For example, FIG. 9 illustrates a third example of a process 900 for managing backup power sources to manage power draw from an external, utility-provided AC power source, in accordance with various embodiments.

First, the system can provide electrical power to one or more electronic components by a power supply unit receiving electrical power provided by an electric utility source, as described above with reference to FIGS. 7 and 8. (Act 901), and when the utility-provided AC power source is in high demand, the system can receive an indication that demand for the utility-provided electrical power has exceeded a first threshold. (Act 902). Based on this indication, the system can prepare to provide supplemental power to offset the electrical power provided by the electric utility source by selecting a subset of backup battery units associated with low-priority tasks or components to provide the supplemental power. (Act 903). For example, in embodiments where the electronic components include datacenter servers and support equipment, some of the servers may be designated as high-priority because they maintain customer-facing websites, order information, security measures, or other essential services. Conversely, some servers may be designated low-priority if they provide nonessential services (e.g. backup servers or underutilized servers), and other non-server electronic components may be designated low-priority if they can withstand periods of downtime without incurring substantial loss to their users, e.g., long-term data storage. The system can preferentially select a subset of backup battery units associated with low-priority electronic components for discharging to provide the supplemental electrical power. In some embodiments, the system can progressively utilize backup battery units associated with higher-priority electronic components for providing the supplemental electrical power over time, as those backup battery units associated with low-priority electronic components are exhausted.

Throughout the duration of the period of peak demand, the system may continue to periodically or continuously monitor the demand for the electrical power provided by the electric utility source (Act 904) in order to, e.g., detect changes in power demand or cost. The monitoring can include monitoring power consumption by electronic components, monitoring data provided by the utility provider indicative of instantaneous demand and/or cost, or monitoring an input channel usable by an agent to provide manual input to direct the operation of the system. If an indication is received via any such channel that the period of peak demand has ended, the system can cease discharging electrical power by the subset of backup battery units.

In addition to monitoring the demand for power, the system can monitor the available charge or excess charge of the subset of backup battery units being used at any one time to provide the supplemental power, such that any backup battery unit that exhausts its supply of excess charge over a minimum required charge can be prevented from further discharging power to the system. (Act 905). Overall, the subset of backup battery units can continue to provide supplemental power to supplement the utility-provided power until either (a) the period of peak demand has ended, at which time providing backup battery unit power may no longer be cost-efficient, or (b) the amount of available charge remaining in the subset of backup battery units is insufficient, i.e., all of the backup battery units at an appropriate priority level for selection have been exhausted. (Act 906). If additional backup battery units are available, and possess sufficient excess charge to be used, the system can select a second subset of backup battery units associated with higher-priority tasks to provide the supplemental power. (Act 907).

Various computing environments may be used, as appropriate, to implement various embodiments as described herein including web- or cloud-based computing environments, computing environments based on local controllers, or combinations of the above. User or client devices can include any of a number of general purpose personal computers, such as desktop or laptop computers running a standard operating system, as well as cellular, wireless and handheld devices running mobile software and capable of supporting a number of networking and messaging protocols. Such an environment also can include a number of workstations running any of a variety of commercially-available operating systems and other known applications for purposes such as development and database management. These workstations also can include other electronic components, such as dummy terminals, thin-clients, gaming systems and other devices capable of communicating via a network and used for communicating with sensors, displays, actuators, and user interfaces, among other devices.

For example, user interfaces (such as user input/output devices 107, FIG. 1) can include any appropriate device operable to send and receive requests, messages, or information over an appropriate network and convey information back to a user of the device. Examples of such devices include portable displays, personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used in conjunction with such a network can depend at least in part upon the type of network and/or environment selected. Protocols and components for communicating via such a network are well known and will not be discussed herein in detail. Communication over the network can be enabled by wired or wireless connections and combinations thereof.

Suitable computing environments can include, in various embodiments, a server and data store. It should be understood that there can be several servers, layers, or other elements, processes, or components, which may be chained or otherwise configured, which can interact to perform tasks such as obtaining data, processing said data, and communicating data or with users. For example, according to various embodiments, a controller such as AC power supply controller 105 (FIG. 1) can include a server and/or a virtual machine emulated by a server. As used herein the term "data store" refers to any device or combination of devices capable of storing, accessing, and retrieving data, which may include any combination and number of data servers, databases, data storage devices, and data storage media, in any standard, distributed, or clustered environment. The server can include any appropriate hardware and software for integrating with the data store as needed to execute aspects of one or more applications for the client device, handling a majority of the data access and logic for an application. It should be understood that servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include a mechanism for storing data for reporting, analysis, or other such purposes. The data store is operable, through logic associated therewith, to receive instructions and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

A computing environment according to various embodiments can be a distributed computing environment utilizing several computer systems and components that are interconnected via communication links, using one or more computer networks or direct connections. However, it will be appreciated by those of ordinary skill in the art that the embodiments discussed above could operate equally well in a computing environment having fewer or a greater number of components, including systems operated under the control of a single computing device in communication with any suitable combination of the various sensors, input/output devices and/or actuators discussed herein.

Computing environments as discussed herein can include a variety of data stores and other memory and storage media as discussed above. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Suitable media can also include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for managing consumption by a datacenter of electrical power provided by an electric utility source, the system comprising:

a power supply unit for supplying a first portion of a utility power based direct current (DC) electrical power to low-priority electronic components and a second portion of the utility power based DC electrical power to high-priority electronic components in the datacenter, wherein the power supply unit receives an alternating current (AC) electrical power supplied by an electric utility source;

a battery charger;

one or more first backup battery units for supplying a first backup DC electrical power to the low-priority electronic components in the datacenter, wherein the one or more first battery backup units are chargeable by the battery charger;

one or more second backup battery units for supplying a second backup DC electrical power to the high-priority electronic components in the datacenter, wherein the one or more second battery backup units are chargeable by the battery charger; and a controller comprising at least one processor and at least one memory device containing executable instructions that, when executed by the at least one processor, cause the controller to:

in response to receiving a first indication that a demand for an aggregate electrical power provided by the electric utility source has exceeded a first threshold, cause the one or more first backup battery units to supply a supplemental DC electrical power to the low-priority electronic components in the datacenter to supplement the first portion of the utility power based DC electrical power supplied to low-priority electronic component by the power supply unit and prevent the one or more second backup battery units from supplying DC electrical power to the high-priority electronic components while the high-priority electronic components are supplied the second portion of the utility power based DC electrical power by the power supply unit and the low-priority electronic components are supplied the supplemental DC electrical power by the one or more first battery backup units, wherein the aggregate electrical power includes electrical power provided by the electric utility source to external users other than the datacenter; and in response to receiving a second indication that the demand for the aggregate electrical power provided by the electric utility source has fallen below a second threshold that is less than the first threshold, cause the one or more first backup battery units to be charged by the battery charger.

2. The system of claim 1, wherein:

the one or more first backup battery units have a first reserve charge requirement;

the one or more second backup battery units have a second reserve charge requirement; and the executable instructions are further configured to cause the controller to:

cause at least one of the one or more second backup battery units to discharge a supplemental DC electrical power to the high-priority electronic components in the datacenter to supplement the second portion of the utility power based DC electrical power supplied to the high-priority electronic components by the power supply unit in response to the at least one of the one or more second backup battery units having a charge level that exceeds the second reserve charge requirement and the at least one of the one or more second backup battery units have a charge level that does not exceed the second reserve charge requirement; and prevent the one or more first backup battery units from discharging electrical power in response to the one or more first backup battery units having a charge level that does not exceed the first reserve charge requirement.

3. A computer-implemented method, comprising:

providing a utility power based direct current (DC) electrical power to low-priority electronic components and high-priority electronic components of a datacenter by a power supply unit receiving an alternating current (AC) electrical power produced from a utility AC electrical power provided by an electric utility source;

receiving a first indication that a demand for an aggregate electrical power provided by the electric utility source has exceeded a first threshold, wherein the aggregate electrical power includes electrical power provided by the electric utility source to external users other than the datacenter; and in response to receiving the first indication, causing one or more first backup battery units configured to supply backup electrical power to the low-priority electronic components to supply a supplemental DC electrical power to the low-priority electronic components while preventing discharging of one or more second backup battery units configured to supply backup electrical power to the high-priority electronic components, wherein the supplemental DC electrical power is supplied to the low-priority electronic components in conjunction with the utility power based DC electrical power provided by the power supply unit.

4. The computer-implemented method of claim 3, further comprising:

monitoring an instantaneous cost of the utility AC electrical power provided by the electric utility source; and generating the first indication that the demand for the aggregate electrical power provided by the electric utility source has exceeded the first threshold based on the instantaneous cost of the utility AC electrical power provided by the electric utility source exceeding a first cost threshold.

5. The computer-implemented method of claim 4, wherein:

the first cost threshold is a function of an off-peak cost of the utility AC electrical power provided by the electric utility source.

6. The computer-implemented method of claim 3, further comprising:

receiving a second indication that the demand for the aggregate electrical power provided by the electric utility source is less than a second threshold that is lower than the first threshold; and in response to receiving the second indication, recharging the one or more first backup battery units configured to supply backup electrical power to the low-priority electronic components using the utility AC electrical power provided by the electric utility source.

7. The computer-implemented method of claim 3, wherein:

the first threshold corresponds to a period of increased consumption of the aggregate electrical power provided by the electric utility source, or a period of low availability of the aggregate electrical power from the electric utility source; and the first indication is generated based on utility power data received from a provider of the electric utility source indicative of the period of increased consumption of the aggregate electrical power or the period of low availability of the aggregate electrical power.

8. The computer-implemented method of claim 3, wherein the first threshold corresponds to a period of peak demand for the aggregate electrical power provided by the electric utility source, the method further comprising:

detecting an available energy supply of the one or more first backup battery units, the available energy supply comprising an amount of stored energy in excess of a reserve level of energy reserved for the low-priority electronic components; and causing to provide the supplemental DC electrical power at a rate based on the available energy supply and a duration of a period of peak demand for the aggregate electrical power provided by the electric utility source such that the supplemental DC electrical power is provided consistently for the duration of the period of peak demand.

9. The computer-implemented method of claim 3, wherein causing the one or more first backup battery units to provide the supplemental DC electrical power further comprises:

selecting a subset of the one or more first backup battery units to provide the supplemental DC electrical power to the low-priority electronic components based on an available charge level of the subset of the one or more first backup battery units; and simultaneously discharging the subset of the one or more first backup battery units to provide the supplemental DC electrical power.

10. The computer-implemented method of claim 9, further comprising:

detecting that a charge level of a first backup battery unit for discharging of the one or more first backup battery units has decreased to a reserve charge requirement of the first backup battery unit for discharging; and in response to the charge level of the first backup battery unit for discharging decreasing to the reserve charge requirement of the first backup battery unit for discharging, causing the first backup battery unit for discharging to cease discharging, and causing a second backup battery unit for discharging of the one or more second backup battery units to discharge to provide supplemental DC electrical power to the high-priority electronic components.

11. The computer-implemented method of claim 3, wherein causing the one or more first backup battery units to provide the supplemental DC electrical power comprises:

selecting a first backup battery unit for discharging and a second backup battery unit for discharging of the one or more first backup battery units for providing the supplemental DC electrical power;

discharging the first backup battery unit for discharging to provide a first portion of the supplemental DC electrical power to a first power network; and discharging the second backup battery unit for discharging to provide a second portion of the supplemental DC electrical power to a second power network that is separate from the first power network.

12. A system, comprising:

a power supply unit configured to generate a utility power based direct current (DC) electrical power from an alternating current (AC) electrical power produced from a utility AC power provided by an electric utility source and supply a first portion of the utility power based DC electrical power to low-priority electronic components of a datacenter and supply a second portion of the utility power based DC electrical power to high-priority electronic components of the datacenter;

one or more first backup battery units configured for supplying a first backup DC electrical power to the low-priority electronic components;

one or more second backup battery units configured for supplying a second backup DC electrical power to the high-priority electronic components; and a controller comprising at least one processor and at least one memory device containing executable instructions that, when executed by the at least one processor, cause the controller to:

receive a first indication that a demand for an aggregate electrical power provided by the electric utility source has exceeded a first threshold, wherein the aggregate electrical power includes electrical power provided by the electric utility source to external users other than the datacenter; and in response to receiving the first indication, cause the one or more first backup battery units to discharge to supply an amount of supplemental DC electrical power to the low-priority electronic components while preventing discharging of the one or more second backup battery units to prevent supplying supplemental DC electrical power to the high-priority electronic components.

13. The system of claim 12, wherein:

each of the one or more first backup battery units has a reserve charge requirement; and the executable instructions are further configured to cause the controller to:

select a first backup battery unit for discharging from the one or more first backup battery units based on a charge level of the first backup battery unit for discharging exceeding the reserve charge requirement of the first backup battery unit for discharging;

cause the first backup battery unit for discharging to discharge to supply supplemental DC electrical power to the low-priority electronic components while the charge level of the first backup battery unit for discharging exceeds the reserve charge requirement of the first backup battery unit for discharging; and prevent the first backup battery unit for discharging from discharging in response to detecting that the charge level of the first backup battery unit for discharging has been reduced to the reserve charge requirement of the first backup battery unit for discharging.

14. The system of claim 13, wherein the executable instructions are further configured to cause the controller to:

select a second backup battery unit for discharging from the one or more first backup battery units in response to the detecting that the charge level of the first backup battery unit for discharging has been reduced to the reserve charge requirement of the first backup battery unit for discharging; and cause the second backup battery unit for discharging to discharge to supply supplemental DC electrical power to the low-priority electronic components.

15. The system of claim 12, wherein the executable instructions are further configured to cause the controller to:

in response to receiving a second indication that the demand for the aggregate electrical power provided by the electric utility source has fallen below a second threshold that is less than the first threshold, cause the one or more first backup battery units to charge to store electrical power provided by the electric utility source while the power supply unit receives the AC electrical power and uses the AC electrical power to supply the utility power based DC electrical power to the low-priority electronic components.

16. A non-transitory computer readable storage medium containing executable instructions that, when executed by a processor, cause the processor to perform operations, comprising:

instructing a power supply unit to provide a utility power based direct current (DC) electrical power to one or more low-priority electronic components of a datacenter and one or more high-priority electronic components of the datacenter, the power supply unit receiving an alternating current (AC) electrical power produced from a utility AC electrical power provided by an electric utility source;

receiving a first indication that a demand for an aggregate electrical power provided by the electric utility source has exceeded a first threshold, wherein the aggregate electrical power includes electrical power provided by the electrical utility source to external users other than the datacenter;

instructing one or more first backup battery units electrically connected with the one or more low-priority electronic components to provide a first supplemental DC electrical power to the one or more low-priority electronic components in response to receiving the first indication, wherein the first supplemental DC electrical power offsets at least a portion of the utility power based DC electrical power provided by the power supply unit to the one or more low-priority electronic components; and preventing one or more second backup battery units electrically connected with the one or more high-priority electronic components from discharging to prevent supplying a second supplemental DC electrical power to the one or more high-priority electronic components.

* * * * *